(12) United States Patent
Pettinato et al.

(10) Patent No.: US 8,726,503 B2
(45) Date of Patent: May 20, 2014

(54) METHOD OF POSITIONING A BEARING ASSEMBLY AND CENTERING SUPPORT STRUCTURE THEREFOR

(75) Inventors: Brian C. Pettinato, Greensburg, PA (US); Pranabesh De Choudhury, Greensburg, PA (US)

(73) Assignee: Elliott Company, Jeannette, PA (US)

( * ) Notice: Subject to any disclaimer, the term of this patent is extended or adjusted under 35 U.S.C. 154(b) by 554 days.

(21) Appl. No.: 12/603,981

(22) Filed: Oct. 22, 2009

(65) Prior Publication Data

US 2010/0037462 A1     Feb. 18, 2010

Related U.S. Application Data

(62) Division of application No. 11/237,332, filed on Sep. 28, 2005, now Pat. No. 7,625,121.

(51) Int. Cl.
*B21D 53/10* (2006.01)
(52) U.S. Cl.
USPC ........................ 29/889.2; 29/898.04; 384/103
(58) Field of Classification Search
USPC ........... 29/402.1, 889.1, 898.04; 384/99, 535, 384/581, 103, 106
See application file for complete search history.

(56) References Cited

U.S. PATENT DOCUMENTS

| | | | |
|---|---|---|---|
| 2,588,636 A | 3/1952 | Korsgren | |
| 3,366,427 A * | 1/1968 | Silver et al. | 384/103 |
| 3,979,155 A | 9/1976 | Sood et al. | |
| 3,994,541 A | 11/1976 | Geary et al. | |
| 4,097,094 A | 6/1978 | Gardner | |
| 4,213,661 A | 7/1980 | Marmol | |
| 4,257,495 A | 3/1981 | de Brie Perry | |
| 4,348,066 A * | 9/1982 | Agrawal et al. | 384/124 |
| 4,366,994 A | 1/1983 | Yoshioka | |
| 4,392,751 A | 7/1983 | Ida et al. | |
| 4,400,098 A | 8/1983 | Lacey et al. | |
| RE31,394 E | 9/1983 | Streifert | |
| 4,415,281 A * | 11/1983 | Agrawal | 384/103 |

(Continued)

FOREIGN PATENT DOCUMENTS

| | | |
|---|---|---|
| CH | 558481 | 1/1975 |
| DE | 3728039 A1 | 3/1989 |

(Continued)

OTHER PUBLICATIONS

Edney, Stephen L.; "Retrofitting a Large Steam Turbine with a Mechanically Centered Squeeze Film Damper"; Proceedings of the 28th Turbomachinery Symposium, Texas A & M University, 1999.

*Primary Examiner* — Alexander P Taousakis
(74) *Attorney, Agent, or Firm* — The Webb Law Firm

(57) ABSTRACT

A method of positioning a bearing of a turbomachine in a squeeze film annulus is disclosed. The method includes providing a bearing in which a rotor shaft is disposed and a bearing support mounted about and radially supporting the bearing, with the bearing support at least in part defining the squeeze film annulus. A further step typically includes providing a plurality of centering elements associated with the bearing and bearing support and acting to center the bearing within the squeeze film annulus, with the centering elements provided at radially spaced locations around the bearing. An additional step in the method may include individually machining or shimming the centering elements to adjust the positioning of the bearing in the squeeze film annulus or to impart pre-load to improve the resiliency of the centering elements.

4 Claims, 12 Drawing Sheets

(56) References Cited

U.S. PATENT DOCUMENTS

| | | | | |
|---|---|---|---|---|
| 4,440,456 A | | 4/1984 | Klusman | |
| 4,509,804 A | | 4/1985 | Klusman | |
| 4,527,910 A | | 7/1985 | Fleming | |
| 4,527,912 A | | 7/1985 | Klusman | |
| 4,553,855 A | | 11/1985 | De Choudhury | |
| 4,602,873 A | | 7/1986 | Izumi et al. | |
| 4,605,316 A | | 8/1986 | Utecht | |
| 4,626,111 A | | 12/1986 | Swasey et al. | |
| 4,668,105 A | | 5/1987 | Furukawa et al. | |
| 4,669,893 A | | 6/1987 | Chalaire et al. | |
| 4,838,028 A | | 6/1989 | Witt | |
| 4,867,655 A | | 9/1989 | Barbic et al. | |
| 4,872,767 A | | 10/1989 | Knapp | |
| 4,952,076 A | | 8/1990 | Wiley, III et al. | |
| 4,971,458 A | | 11/1990 | Carlson | |
| 4,981,415 A | | 1/1991 | Marmol et al. | |
| 4,992,024 A | | 2/1991 | Heydrich | |
| 5,044,781 A | | 9/1991 | Werner | |
| 5,048,978 A | | 9/1991 | Singh | |
| 5,071,262 A | | 12/1991 | Monzel et al. | |
| 5,088,840 A | | 2/1992 | Radtke | |
| 5,116,143 A | * | 5/1992 | Saville et al. | 384/106 |
| 5,201,585 A | | 4/1993 | Gans et al. | |
| 5,205,384 A | | 4/1993 | Heshmat | |
| 5,207,511 A | | 5/1993 | Bobo | |
| 5,215,384 A | | 6/1993 | Maier | |
| 5,228,378 A | | 7/1993 | Bathory | |
| 5,316,391 A | | 5/1994 | Monzel | |
| 5,380,100 A | | 1/1995 | Yu | |
| 5,421,655 A | | 6/1995 | Ide et al. | |
| 5,425,584 A | | 6/1995 | Ide | |
| 5,498,083 A | * | 3/1996 | Brown | 384/106 |
| 5,531,522 A | | 7/1996 | Ide et al. | |
| 5,603,574 A | | 2/1997 | Ide et al. | |
| 5,613,781 A | | 3/1997 | Kuzdzal et al. | |
| 5,634,723 A | * | 6/1997 | Agrawal | 384/106 |
| 5,651,616 A | | 7/1997 | Hustak et al. | |
| 5,738,356 A | | 4/1998 | Marshall | |
| 5,738,445 A | | 4/1998 | Gardner | |
| 5,803,612 A | | 9/1998 | Bättig | |
| 6,065,875 A | | 5/2000 | Mitsubori et al. | |
| 6,155,720 A | * | 12/2000 | Battig | 384/99 |
| 6,158,893 A | * | 12/2000 | Heshmat | 384/106 |
| 6,196,721 B1 | | 3/2001 | Farkaly | |
| 6,379,046 B1 | | 4/2002 | Zeidan | |
| 6,478,553 B1 | | 11/2002 | Panos et al. | |
| 6,558,041 B2 | | 5/2003 | Laos | |
| 6,637,942 B2 | | 10/2003 | Dourlens et al. | |
| 6,883,967 B2 | | 4/2005 | Robb et al. | |
| 7,401,981 B2 | | 7/2008 | Matheny | |
| 7,530,742 B2 | * | 5/2009 | Ishii et al. | 384/106 |
| 7,553,086 B2 | * | 6/2009 | Kang et al. | 384/103 |
| 8,182,153 B2 | * | 5/2012 | Singh et al. | 384/99 |
| 2002/0067871 A1 | | 6/2002 | Bos et al. | |
| 2002/0076124 A1 | | 6/2002 | Bos et al. | |
| 2003/0012466 A1 | * | 1/2003 | Shimizu et al. | 384/103 |
| 2005/0163407 A1 | | 7/2005 | Kang et al. | |

FOREIGN PATENT DOCUMENTS

| | | |
|---|---|---|
| DE | 3831928 A1 | 3/1990 |
| GB | 2180012 A | 3/1987 |
| JP | 55107114 | 8/1980 |
| JP | 56160422 | 12/1981 |
| JP | 58030524 | 2/1983 |

* cited by examiner

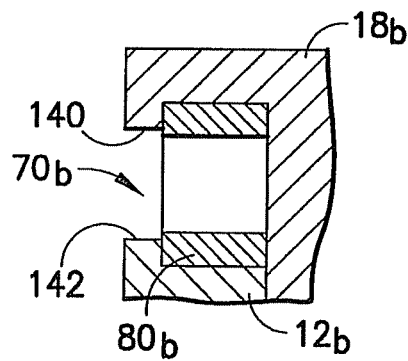 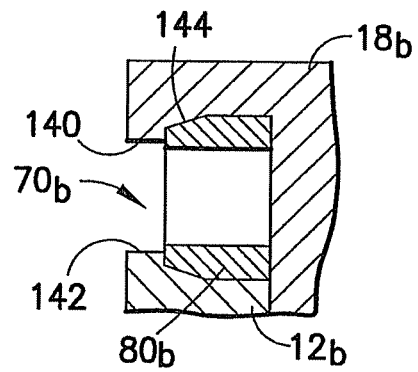
FIG. 7A    FIG. 7B
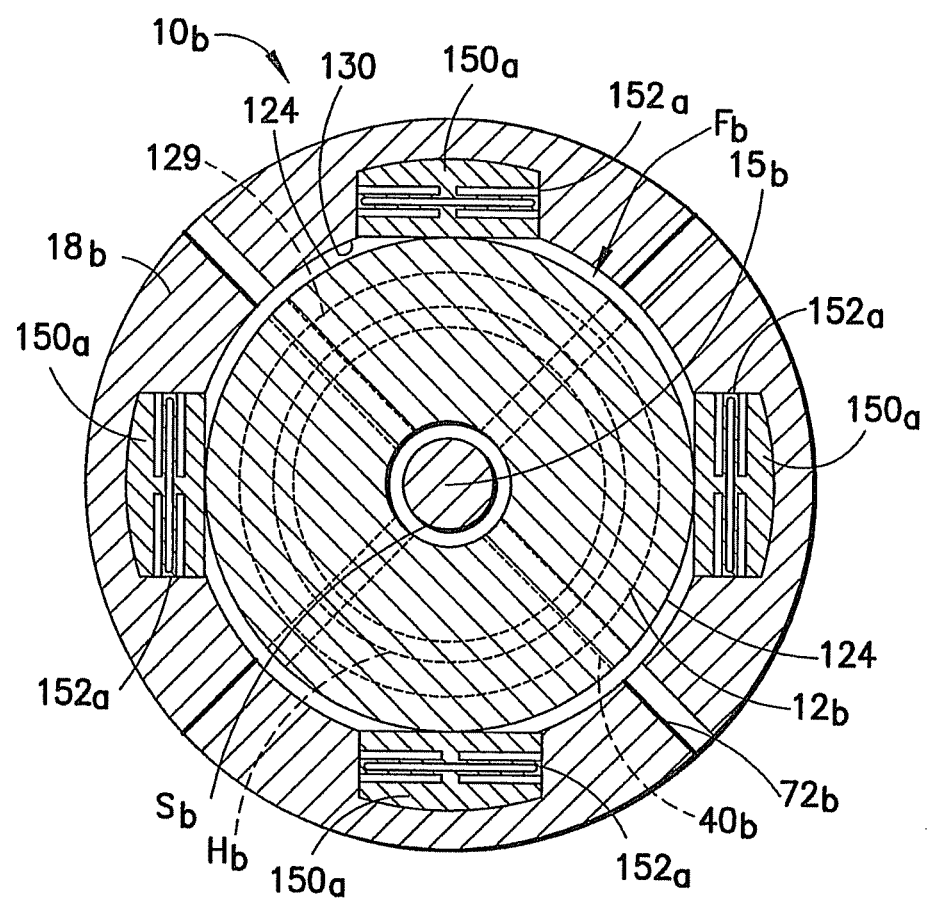
FIG. 8A

METHOD OF POSITIONING A BEARING ASSEMBLY AND CENTERING SUPPORT STRUCTURE THEREFOR

CROSS-REFERENCE TO RELATED APPLICATIONS

This application is a division of and claims priority to U.S. patent application Ser. No. 11/237,332, filed on Sep. 28, 2005, the disclosure of which is incorporated herein by reference.

BACKGROUND OF THE INVENTION

1. Field of the Invention

The present invention relates to bearings, such as roller bearings, journal bearings, sleeve bearings and the like, used to support rotating shafts in turbomachinery such as compressors and turbines and, more particularly, a bearing assembly including a squeeze film damper with a support structure for centering support of a bearing within the squeeze film damper annulus.

2. Description of Related Art

Large axial and radial forces act on high-speed rotors, such as the shafts of compressors or turbines, and these forces are compensated for by appropriately configured and arranged thrust bearings and journal bearings. In addition, it is also necessary to provide compensation for the radial rotor vibrations if trouble-free operation of such turbomachinery is to be ensured. For this purpose, squeeze film dampers are often employed in turbomachines to reduce the amplitude of the rotor vibrations. Typically, a squeeze film damper consists essentially of an annular gap configured between a bearing and a bearing support that is connected to an oil supply. The bearing may be a roller bearing, or may be of the hydrodynamic bearing type with hydrodynamic lubricating film on the shaft side, or may be any other bearing that supports a rotating shaft. The bearing may or may not be assembled into a sleeve. The bearing or bearing and sleeve may be referred to as a floating sleeve. In the case of a floating sleeve located within the annular gap of a squeeze film damper, the problem arises, particularly in the case of heavy rotors, that the floating sleeve is not centered in the annular gap during operation. Rather, the floating sleeve is positioned in the lower region of the bore in which it is situated. This arrangement can lead to poor damping properties and, further, to wear of the corresponding components.

Numerous possibilities for centering a floating sleeve within a squeeze film damper are known to avoid these disadvantages. One arrangement uses centering O-rings in the annular region of the squeeze film damper. Another arrangement uses centering provided by means of a lateral spring rod cage and by means of leaf springs arranged radially and locally at the periphery. A further squeeze film damper centering arrangement uses bending rods arranged radially at the outside periphery. A disadvantageous feature of O-ring centering, however, is that this arrangement has a nonlinear spring characteristic and unsatisfactory long-term behavior whereas, in the case of the spring rod cage, a very large amount of axial installation space is necessary. Moreover, bending rods require a large amount of radial space and, because of the large number of individual parts, are high cost and often deliver unsatisfactory concentricity accuracy. The leaf spring solution, which likewise requires a large amount of radial space, can only be manufactured by an electrical discharge machining method. In this case, furthermore, there is danger of shaft-side deformation of the bearing sleeve.

Based on the foregoing, there is considerable room for improvement in the field of bearing design and in the design of squeeze film dampers, particularly spring-backed or aided squeeze film dampers. The invention disclosed herein provides an improved and flexible structural support for centering a floating sleeve in a squeeze film annulus and overcomes many of the foregoing disadvantages found in current bearing and squeeze film damper design.

SUMMARY OF THE INVENTION

The bearing assembly for a rotating shaft according to one embodiment comprises a bearing in which the shaft is disposed, a bearing support mounted about and radially supporting the bearing, the bearing support at least in part defining a squeeze film annulus of the bearing assembly, and at least one centering element associated with the bearing and bearing support and acting to center the bearing within the squeeze film annulus.

In one embodiment, the at least one centering element may comprise at least one wave spring. The at least one wave spring may substantially encircle the bearing support.

In another embodiment, the at least one centering element may comprise a plurality of beam springs provided at radially spaced locations around the bearing. The bearing assembly may further comprise a housing enclosing the bearing support, and each beam spring may comprise a raised support pad at each end to seat against the housing and a raised support pad at an approximate center of the beam spring to seat against the bearing support. The beam springs are typically uniformly distributed around the bearing.

In a further embodiment, the at least one centering element may comprise a plurality of cylinder springs provided at radially spaced locations around the bearing. The cylinder springs are typically uniformly spaced around the bearing. The cylinder springs may be tapered on at least one axial end.

In a still further embodiment, the at least one centering element may comprise a plurality of load cell springs positioned at radially spaced locations around the bearing. Each load cell spring typically comprises at least one beam member. The beam member may define at least one internal space therein. Each load cell spring may further comprise a plurality of overlapping beam members. At least one of the overlapping beam members may define an internal space therein. The overlapping beam members may define intervening spaces between the beam members. Each load cell spring may comprise a body defining at least one internal space therein.

The bearing assembly, in another embodiment, comprises a bearing in which a shaft is disposed, a bearing support mounted about and radially supporting the bearing, the bearing support at least in part defining a squeeze film annulus of the bearing assembly, and a plurality of centering elements associated with the bearing and bearing support and acting to center the bearing within the squeeze film annulus, the centering elements provided at radially spaced locations around the bearing.

In one embodiment, the centering elements comprise cylinder springs provided at the radially spaced locations around the bearing. In another embodiment, the centering elements comprise a plurality of load cell springs provided at the radially spaced locations around the bearing. Each load cell spring typically comprises at least one beam member. The beam member may define at least one internal space therein. Each load cell spring may further comprise a plurality of overlapping beam members. At least one of the overlapping beam members may define an internal space therein. The overlapping beam members may define intervening spaces between the beam members. Each load cell spring may comprise a body defining at least one internal space therein.

In a further aspect, the present invention is a method of positioning a bearing of a turbomachine in a squeeze film annulus. The method may include the steps of providing a bearing in which a rotor shaft is disposed and a bearing support mounted about and radially supporting the bearing, with the bearing support at least in part defining the squeeze film annulus. A further step typically comprises providing a plurality of centering elements associated with the bearing and bearing support and acting to center the bearing within the squeeze film annulus, with the centering elements provided at radially spaced locations around the bearing. An additional step in the method may comprise individually machining or shimming the centering elements to adjust the positioning of the bearing in the squeeze film annulus or to impart pre-load to improve the resiliency of the centering elements.

In one embodiment, the centering elements comprise cylinder springs provided at the radially spaced locations around the bearing. In another embodiment, the centering elements comprise a plurality of load cell springs provided at the radially spaced locations around the bearing. The step of providing the plurality of centering elements may comprise providing the load cell springs at uniformly spaced locations around the bearing. Each load cell spring typically comprises at least one beam member. The beam member may define at least one internal space therein. Each load cell spring may further comprise a plurality of overlapping beam members. At least one of the overlapping beam members may define an internal space therein. The overlapping beam members may define intervening spaces between the beam members. Each load cell spring may comprise a body defining at least one internal space therein. As in the prior art, O-rings may be used to seal fluid into a squeeze film annulus, but unlike some of the prior art, the O-rings do not act as a support device for the floating sleeve.

Further details and advantages of the present invention will become clear upon reading the following detailed description in conjunction with the accompanying drawings, wherein like elements are identified with like reference numerals throughout.

BRIEF DESCRIPTION OF THE DRAWINGS

FIG. 7A is a detail view of detail 7A in FIG. 5;

FIG. 7B is a detail view of an alternative configuration of the cylindrical centering element shown in FIG. 7A;

FIG. 8A is a cross-sectional view of the bearing assembly of FIG. 5 comprising load cell springs according to a first embodiment provided in place of the cylindrical centering elements in the centering support structure;

DESCRIPTION OF THE PREFERRED EMBODIMENTS

Figure 1:
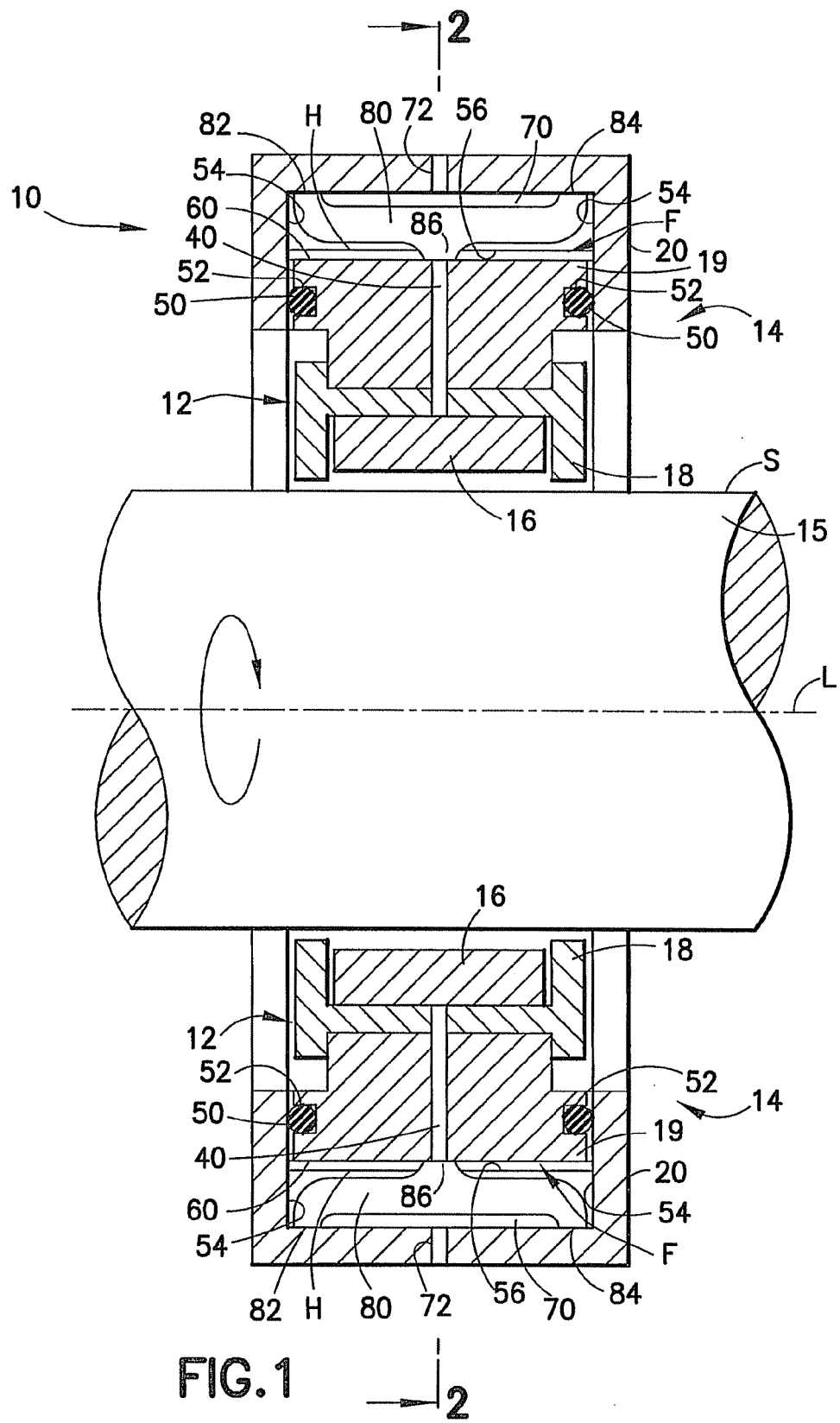
FIG. 1 is a cross-sectional view of a bearing assembly with an embodiment of a centering support structure comprising centering beam springs.

For purposes of the description hereinafter, spatial orientation terms, if used, shall relate to the embodiment of the invention as it is oriented in the accompanying drawing figures. However, it is to be understood that the present invention may assume many alternative variations and embodiments except where expressly specified to the contrary. It is also to be understood that the specific devices and embodiments illustrated in the accompanying drawing figures and described herein are simply exemplary embodiments of the invention, and wherein like elements are designated with like reference numerals throughout.

Figure 2:
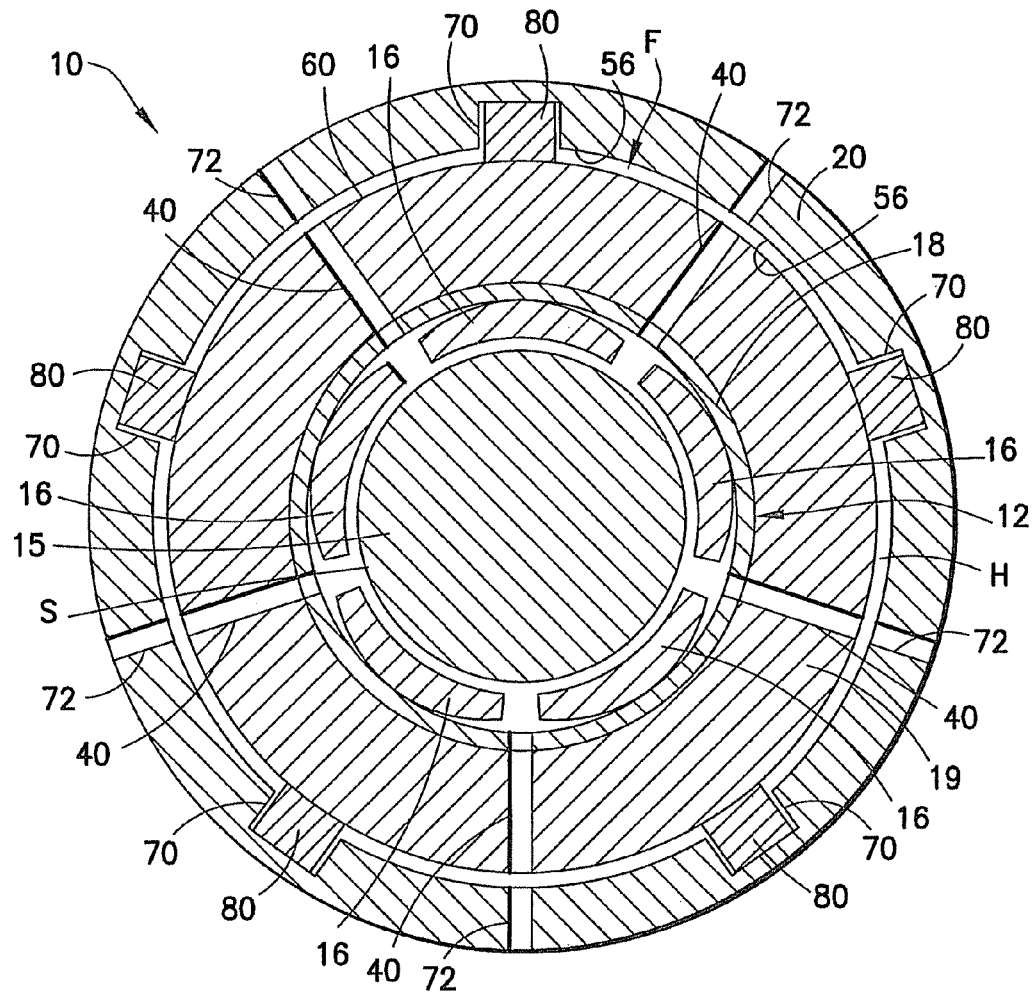
FIG. 2 is a cross-sectional view taken along line 2-2 in FIG. 1.

As illustrated in FIGS. 1 and 2, a bearing assembly 10 is generally shown supporting a rotor shaft of a rotary machine, such as a turbine or a compressor. Such rotor shafts are adapted to carry the turbomachine components and are thus subjected to deflections and vibrations at resonant conditions. Typically, bearing reaction to a rotor shaft at resonant conditions will produce rotor instability if not attenuated. Attenuation is herein achieved by appropriate centering of a bearing of the bearing assembly 10 by the use of various embodiments of a support structure comprising one or more centering elements, typically centering spring elements, and fluid squeeze film damping.

Figure 5:
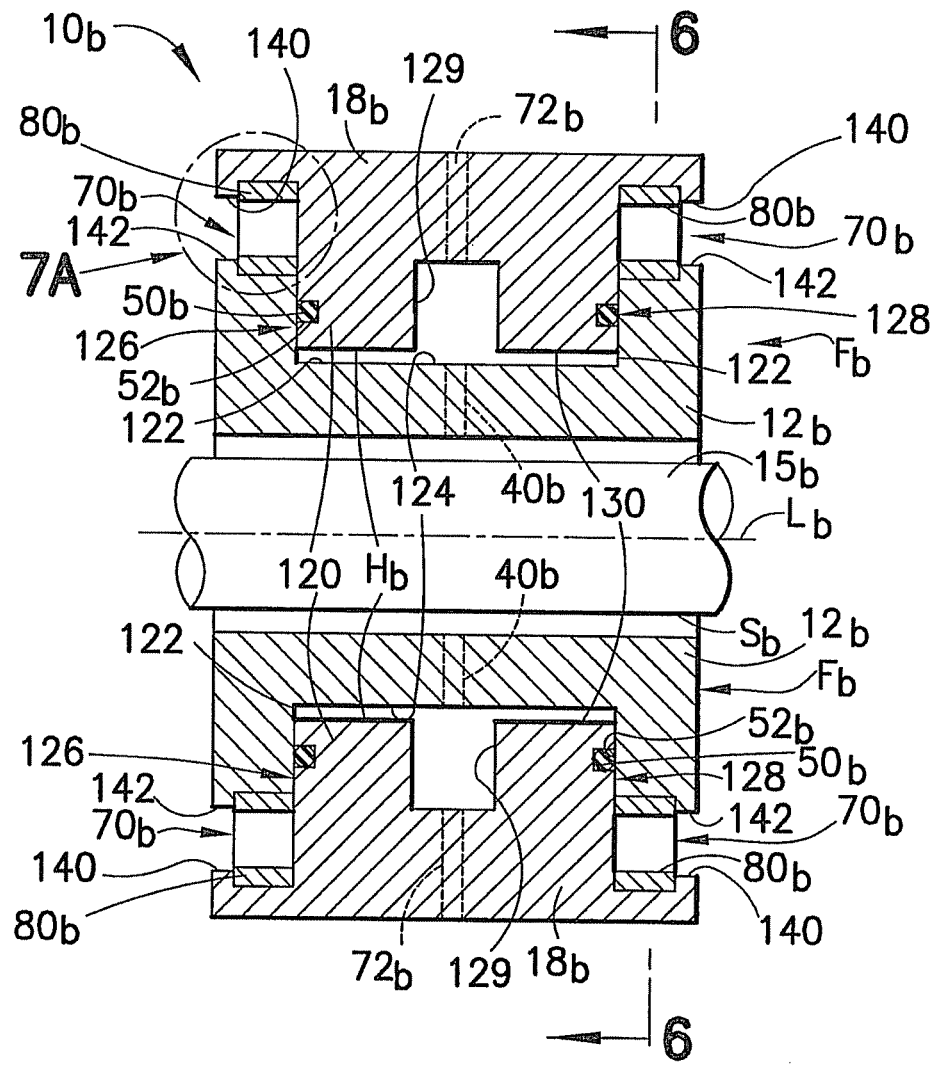
FIG. 5 is a cross-sectional view of a bearing assembly with a further embodiment of a centering support structure support incorporating cylindrical centering elements.
Figure 6:
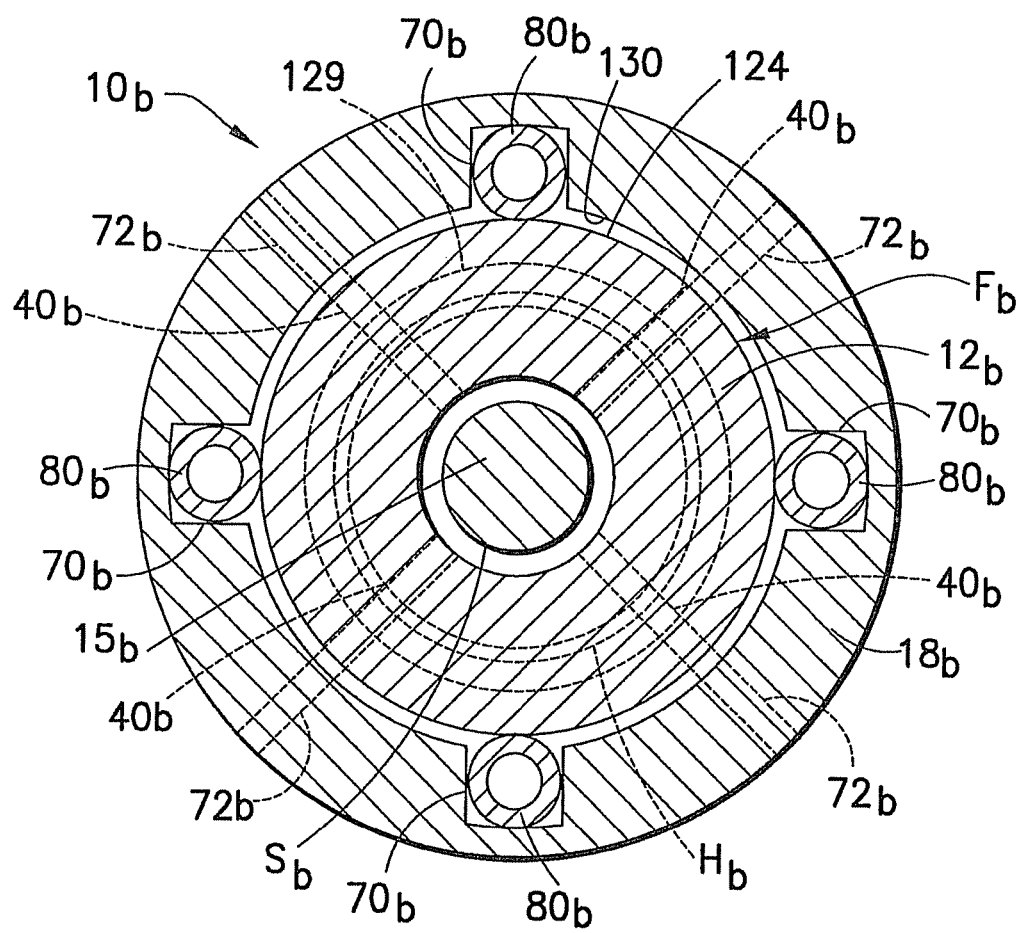
FIG. 6 is a cross-sectional view taken along line 6-6 in FIG. 5.

With continued reference to FIGS. 1 and 2 of the drawings, a first embodiment of bearing assembly 10 is illustrated. Bearing assembly 10 generally comprises a bearing 12 and a bearing support structure 14 disposed about and radially supporting bearing 12. Bearing 12 is, in turn, disposed about a rotor shaft 15 aligned on a longitudinal central shaft axis L. As illustrated, the major components of bearing assembly 10, namely bearing 12 and support structure 14, are also symmetrical about axis L and rotor shaft 15. Rotor shaft 15 may be a solid element, as illustrated, or be provided as a cylindrical-shaped structure aligned on and rotatable about axis L. Rotor shaft 15 has an outer surface S that is engaged in bearing 12. Bearing 12 is illustrated as a tilt pad bearing as one possible embodiment of bearing 12. However, bearing 12 may also take the form of a roller bearing, comprising an inner race rigidly attached to rotor shaft 15, an outer race having an outer cylindrical surface and an annular side face, and a plurality of rollers disposed between the inner and outer races as is typical for roller bearings, or as a sleeve bearing as illustrated in FIGS. 5 and 6 discussed herein.

Bearing 12 generally comprises a plurality of tilt pads 16 and a typically circumferentially-extending tilt pad retainer 18. Tilt pads 16 and tilt pad retainer 18 are typically assembled into an outer sleeve-shaped bearing support 19, and tilt pads 16, tilt pad retainer 18, and sleeve-shaped bearing support 19 may be referred to either as a "damper journal" or as a "floating sleeve" structure; terms that are well-known in the turbomachinery field. Reference character "F" is used herein to identify such a floating sleeve structure. Accordingly, the term "floating sleeve structure" F is intended to comprise tilt pads 16, tilt pad retainer 18, and outer bearing support 19. Bearing 12 typically extends around the circumference or perimeter of rotor shaft 15, with tilt pads 16 generally individually engaged with rotor shaft 15, tilt pad retainer 18, and bearing support 19 forming a generally annular or ring-shaped structure about tilt pads 16 and shaft 15.

Support structure 14 forms a resilient damping structure about bearing 12 and further comprises an outer housing 20 typically enclosing the components of bearing 12 and the individual damping components of the support structure 14. Damping support structure 14 further comprises a plurality of resilient (i.e., flexible) centering elements 80 as described further herein. Centering elements 80 are disposed within housing 20 and generally act between housing 20 and bearing support 19 to resiliently support the floating sleeve structure F.

As indicated previously, bearing 12 depicted in FIGS. 1 and 2 is a multi-component structure comprising tilt pads 16 and tilt pad retainer 18 with bearing support 19 enclosing tilt pads 16 and tilt pad retainer 18. Support structure 14 is disposed about bearing 12 and bearing support 19 on rotor shaft 15. Bearing support 19, as indicated previously, is generally a circumferentially-extending structure disposed about and supporting tilt pads 16. Bearing support 19 further assembles tilts pads 16 and tilt pad retainer 18 into a singular unit or the floating sleeve structure F described previously. Tilt pad retainer 18 and bearing support 19 together cooperatively define a plurality of radial bores 40 (as shown in FIG. 2), to provide lubricating hydraulic fluid to the tilt pads 16. O-ring type axial seals 50 are disposed in respective grooves 52 defined in the axial ends of bearing support 19, and which sealingly abut opposed inner sides 54 of housing 20 to seal a squeeze film annulus H from the external environment. Housing 20 further defines a radial inner side or surface 56.

Bearing support 19 comprises a cylindrical or radial outer side or surface 60 that is enclosed by housing 20. Radial outer side 60 of bearing support 19 is disposed radially inward from radial inner side 56 of housing 20. Housing 20 defines a plurality of discrete recesses 70 that are substantially enclosed by the radial outer side 60 of bearing support 19, and wherein centering elements 80 are individually disposed and retained. Recesses (i.e., chambers) 70 are provided in the radial inner side 56 of housing 20. A hydraulic fluid squeeze film damper is associated with the radial outer side 60 of bearing support 19 and is disposed between the radial outer side 60 and the radial inner side 56 of housing 20. The squeeze film damper is essentially an annulus H filled at least in part with hydraulic fluid between the radial outer side 60 of bearing support 19 and the radial inner side 56 of housing 20 for damping the amplitude of vibration of rotor shaft 15 and floating sleeve structure F. Squeeze film annulus H is in fluid communication with an outside source of hydraulic fluid via a plurality of radial supply openings 72 in housing 20 to supply hydraulic fluid under system pressure to squeeze film annulus H. Supply openings 72 are further in fluid communication with radial bores 40 and are typically continuous with radial bores 40 as illustrated to supply lubricating hydraulic fluid to bearing 12 for lubrication of tilt pads 16.

Centering elements 80 are typically centering spring elements, such as beam springs, and are disposed in the respective recesses 70. Multiple centering elements 80 are disposed about floating sleeve structure F and interrupt the squeeze film annulus H. Typically, centering elements 80 are symmetrically or uniformly distributed or spaced about the circumference of floating sleeve structure F and interrupt squeeze film annulus H at regular intervals, such as 90° or 72° apart. Centering elements 80 are positioned radially outward from bearing 12 and uniformly distributed or spaced about bearing 12. Centering elements 80 act radially on floating sleeve structure F for centering floating sleeve structure F and, hence, bearing 12 in squeeze film annulus H. Centering elements 80 generally provide a centering force that will resist motion of floating sleeve structure F and, therefore, bearing 12, and thereby center floating sleeve structure F in squeeze film annulus H to enhance the effectiveness of squeeze film annulus H in dampening vibration of rotor shaft 15. Centering elements 80 in conjunction with the squeeze film annulus H are used to dampen or control synchronous or non-synchronous vibration in a rotating turbomachine incorporating a rotating shaft such as rotor shaft 15. Such turbomachinery, with which bearing assembly 10 is intended to be applied, typically include high speed rotating turbomachinery, including high speed compressors, turbines, and high pressure-high gas density applications where potential for high subsynchronous vibration is present.

Centering elements 80 are generally disposed to act between housing 20 in each recess 70 and the radial outer side 60 of bearing support 19. Centering elements 80 are generally slightly shorter in axial length than the axial length of the discrete recesses 70. In other embodiments described in this disclosure, a singular or unitary "centering" structure that extends circumferentially about floating sleeve structure F is provided. Such a unitary structure may also be provided as a segmented or multi-component structure comprised of several distinct centering structures or elements that cooperatively form an annular structure to encompass floating sleeve structure F. For example, such a singular or unitary centering structure may comprise a singular, circumferential wave spring, as depicted in FIGS. 3 and 4 discussed herein.

As indicated, centering elements 80 are generally adapted to act on floating sleeve structure F within squeeze film annulus H and, in particular, act between housing 20 and bearing support 19 to provide the centering force to floating sleeve structure F. Centering elements 80 may take any suitable form to accomplish the centering of floating sleeve structure F. However, a desirable form for centering elements 80 is illustrated in FIG. 1. As shown in FIG. 1, centering elements 80 each comprise two axial ends formed with raised support pads 82, 84 which contact the radial inner side 56 of housing 20 in each recess 70. The radial inner side of each centering element 80 is formed with a centrally located reaction pad 86 adapted to contact the outer periphery or radial outer side 60 of bearing support 19. In practice, each centering element 80 is positioned within a respective recesses 70 which is formed continuous with squeeze film annulus H so that central reaction pad 86 of each centering element 80 acts radially on floating sleeve structure F.

Figure 3:
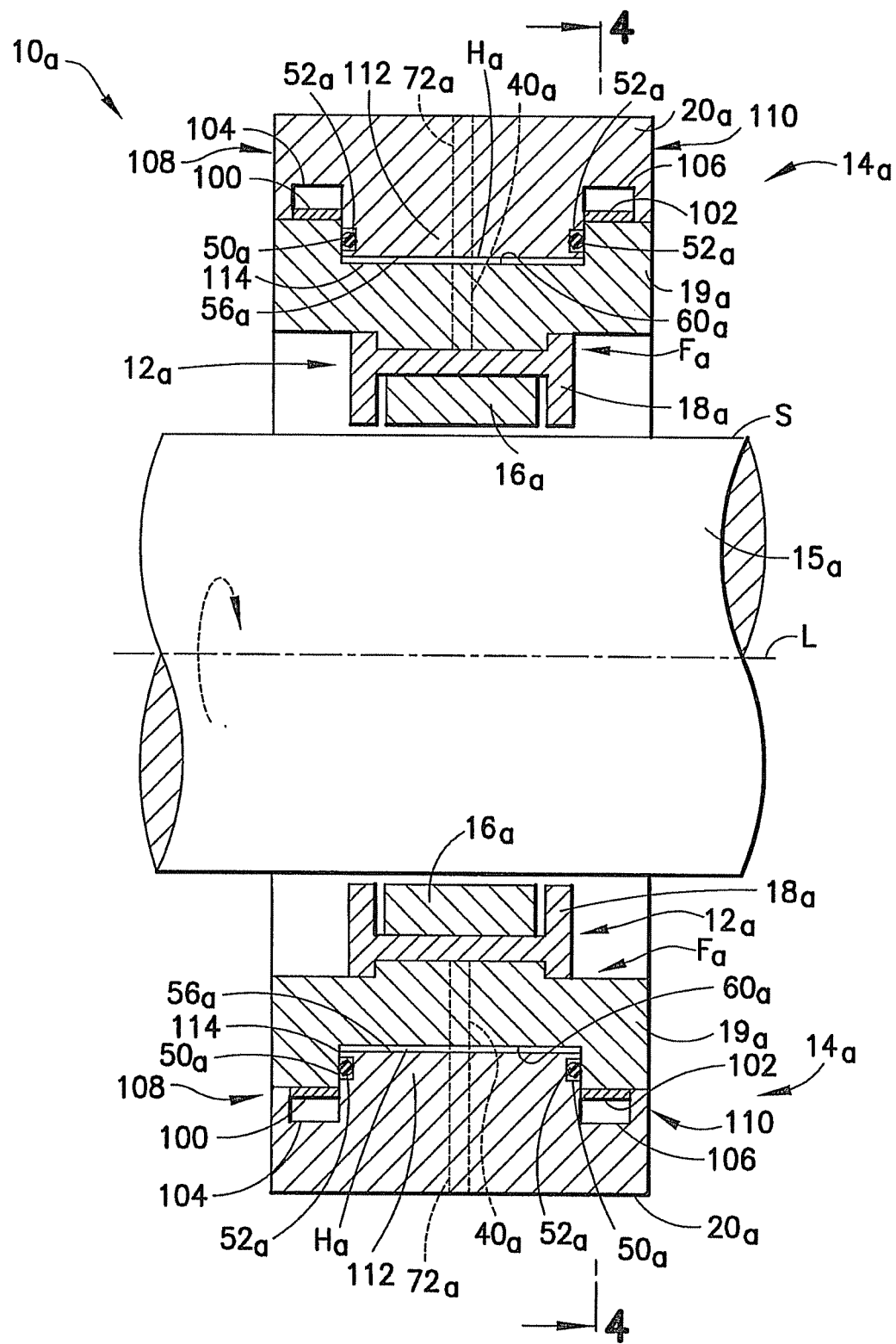
FIG. 3 is a cross-sectional view of a bearing assembly with another embodiment of a centering support structure comprising a centering wave spring.
Figure 4:
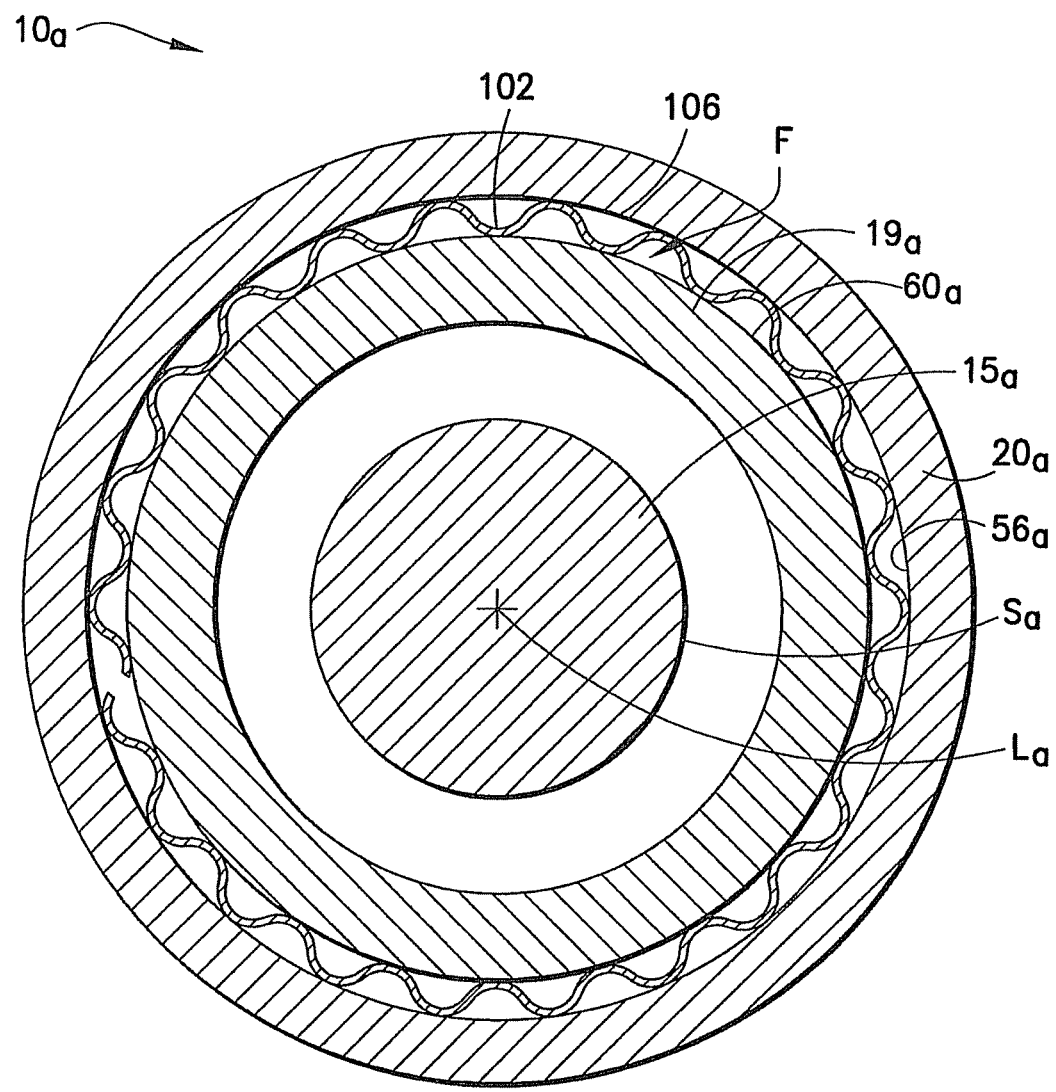
FIG. 4 is a cross-sectional view taken along line 4-4 in FIG. 3.

Referring to FIGS. 3 and 4, another embodiment of bearing assembly 10$_a$ is shown and is generally similar to bearing assembly 10 described hereinabove, with certain modifications to centering support structure 14. In bearing assembly 10$_a$, respective wave springs 100, 102 are associated with floating sleeve structure F$_a$ to provide the centering force to floating sleeve structure F$_a$. As illustrated in FIG. 3, bearing support 19$_a$ is formed for cooperating engagement with housing 20$_a$. Squeeze film annulus H$_a$ is defined or formed between bearing support 19$_a$ and housing 20$_a$. Accordingly, housing 20$_a$ is formed to engage bearing support 19$_a$ and define squeeze film annulus H$_a$ with the bearing support 19$_a$. Hydraulic fluid is supplied through supply openings 72$_a$ in housing 20$_a$ directly to squeeze film annulus H$_a$ and to tilt pads 16$_a$ via continuous radial openings or bores 40$_a$ in bearing support 19$_a$ and tilt pad retainer 18$_a$. It will generally be understood that tilt pads 16$_a$, tilt pad retainer 18$_a$, and bearing support 19$_a$ continue to form a floating sleeve structure F$_a$ in a similar manner to that described in connection with FIGS. 1 and 2.

Housing 20$_a$ further defines respective axially-separated radial receiving openings or recesses 104, 106 wherein wave springs 100, 102 are disposed. The radial outer side 60$_a$ of bearing support 19$_a$ substantially encloses wave springs 100, 102 in recesses 104, 106. Generally, wave springs 100, 102 act between housing 20$_a$ and bearing support 19$_a$ to provide the centering force to centering floating sleeve structure F$_a$ in squeeze film annulus H$_a$. Radial receiving recesses 104, 106 are typically defined at respective axial ends 108, 110 of housing 20$_a$. Waves spring 100, 102 are disposed in radial receiving recesses 104, 106, respectively, and are adapted to act between housing 20$_a$ in receiving recesses 104, 106 and the radial outer side 60$_a$ of bearing support 19$_a$. Wave springs 100, 102 act in radial receiving recesses 104, 106 to provide the centering force to floating sleeve structure F$_a$. Wave springs 102, 104 exert radially inwardly directed forces on floating sleeve structure F$_a$ and radially outwardly directed forces on housing 20$_a$. These applied forces are equal and opposite and function to center floating sleeve structure F$_a$ in squeeze film annulus H$_a$ to inhibit floating sleeve structure F$_a$ from "bottoming" or "topping" out in annulus H$_a$.

As shown in FIG. 3, housing 20$_a$ and bearing support 19$_a$ are formed for a cooperating or mating engagement such that squeeze film annulus H$_a$ is formed between these structures. In one possible embodiment, housing 20$_a$ comprises a radial depending portion 112 that engages a recessed receiving portion 114 defined in radial outer side 60$_a$ of bearing support 19$_a$ in a complimentary fashion. Radial depending portion 112 and recessed receiving portion 114 define squeeze film annulus H$_a$ therebetween. In contrast to bearing assembly 10 discussed previously in connection with FIGS. 1 and 2, O-ring type seals 50$_a$ are disposed in a pair of grooves 52$_a$ now defined substantially in the axial ends of radial depending portion 112 of housing 20$_a$. As indicated previously, a continuous passage is defined by supply openings 72$_a$ in housing 20$_a$ and radial openings 40$_a$ in bearing support 19$_a$ and tilt pad retainer 18$_a$ to supply hydraulic fluid under system pressure directly to squeeze film annulus H$_a$ and tilt pads 16$_a$. O-ring seals 50$_a$, or equivalent sealing structures, provide a sealing engagement with recessed receiving portion 114 of bearing support 19$_a$ to seal squeeze film annulus H$_a$ from the exterior environment.

The various configurations and specified arrangements of bearing assembly 10, 10$_a$ described hereinabove in connection with FIGS. 1-4, are adapted to support both static and dynamic loads as transmitted by bearings 12, 12$_a$ to respective support structures 14, 14$_a$. More particularly, with rotor shafts 15, 15$_a$ at rest, the static load or weight of the rotor shafts 15, 15$_a$ is transmitted from bearings 14, 14$_a$ to floating sleeve structures F, F$_a$. The weight of rotor shafts 15, 15$_a$ on the lower portion of floating sleeve structures F, F$_a$ underneath shafts 15, 15$_a$ will compress the respective squeeze film annulus H, H$_a$. However, the centering elements 80, in the case of bearing assembly 10 of FIGS. 1 and 2, and wave springs 100, 102, in the case of bearing assembly 10$_a$ of FIGS. 3 and 4 will resist such distortion of the squeeze film annulus H, H$_a$ and carry the static weight of rotor shafts 15, 15$_a$ without significant deflection. When dynamic loading is experience with rotor shafts 15, 15$_a$ rotating at high speed, as in a gas turbine engine application, unbalances in rotor shafts 15, 15$_a$ resolve themselves into a resultant radially outwardly directed force which rotates with rotor shafts 15, 15$_a$. The magnitude of the resultant force is proportional to speed and, at high shaft speed, significantly exceeds the static weight of rotor shafts 15, 15$_a$. Since the resultant force exceeds the weight of rotor shafts 15, 15$_a$ and tends to deflect rotor shafts 15, 15$_a$ radially, centering elements 80 and wave springs 100, 102 act in concert with the hydraulic fluid in the respective squeeze film annulus H, H$_a$ to resist radial movement of rotor shafts 15, 15$_a$ and dampen both synchronous and non-synchronous vibration that may occur in rotating shafts 15, 15$_a$.

A further embodiment of a bearing assembly 10$_b$ is shown in FIGS. 5-7. Bearing assembly 10$_b$ is generally similar to bearing assembly 10 discussed previously in connection with FIGS. 1 and 2, in that bearing assembly 10$_b$ returns to the concept of using multiple, discrete centering elements 80$_b$ rather than circumferential or annular wave springs as discussed immediately above in connection with FIGS. 3 and 4. As indicated previously, any suitable bearing structure used in the field of turbomachinery, such as tilt pad bearings, roller bearings, and sleeve bearings, may be used in any of the embodiments of bearing assembly 10, 10$_a$, 10$_b$ described in this disclosure with appropriate modification to the support structure of the bearings 12, 12$_a$, 12$_b$. In FIGS. 5-7, bearing 12$_b$ is shown as a sleeve bearing rather than the tilt pad bearings shown and described previously in connection with FIGS. 1-4. Bearing 12$_b$ may also take the form of these multi-piece bearing constructions if desired. The chief difference between bearing assembly 10$_b$ shown in FIGS. 5-7 and bearing assemblies 10, 10$_a$ discussed previously lies in the configuration of support structure 14$_b$. Certain modifications are made to support structure 14$_b$ when compared to support structure 14 shown in FIGS. 1 and 2 and support structure 14$_a$ shown in FIGS. 3 and 4 to accommodate sleeve bearing 12$_b$.

In bearing assembly 10$_b$, a bearing support, such as bearing supports 19, 19$_a$ used previously in bearing assemblies 10, 10$_a$, is omitted from bearing assembly 10$_b$, with their functions incorporated or integrated into sleeve bearing 12$_b$. In bearing assembly 10$_b$, a singular "bearing retainer" 18$_b$ performs the function of housings 20, 20$_a$ in bearing assemblies 10, 10$_a$, and the term "bearing retainer 18$_b$" is intended to be synonymous in this disclosure with housings 20, 20$_a$ discussed previously. Sleeve bearing 12$_b$ alone forms a "floating sleeve structure" F$_b$ similar to floating sleeve structures F, F$_a$ described previously. Bearing retainer or "support" 18$_b$ now cooperates or engages directly with sleeve bearing 12$_b$ and supports sleeve bearing 12$_b$. Multiple centering elements 80$_b$ are provided to act between bearing retainer 18$_b$ and sleeve bearing $12_b$ to provide the centering force directly to bearing $12_b$ and assist the squeeze film damping provided by squeeze film annulus $H_b$.

Bearing retainer $18_b$ is disposed radially outward from sleeve bearing $12_b$ and defines squeeze film annulus $H_b$ with sleeve bearing $12_b$. Bearing retainer $18_b$ and bearing $12_b$ are formed in an analogous manner to housing $20_a$ and bearing support $19_a$ discussed previously in connection with FIGS. 3 and 4 and cooperate in a similar complimentary fashion. In particular, in one possible embodiment, bearing retainer $18_b$ comprises a radial depending portion 120 that engages a recessed receiving portion 122 defined in a radial outer surface 124 of sleeve bearing $12_b$. Radial depending portion 120 and recessed receiving portion 122 define squeeze film annulus $H_b$ therebetween. In a similar manner to bearing assembly $10_a$, O-ring type seals $50_b$ are disposed in a pair of grooves $52_b$ now defined substantially in axial ends 126, 128 of radial depending portion 120 of bearing retainer $18_b$. A continuous passage is defined by radial openings or bores $72_b$ in bearing retainer $18_b$ to supply hydraulic fluid under system pressure to an annular distribution groove 129 that feeds directly to squeeze film annulus $H_b$ and to sleeve bearing $12_b$ through radial bores $40_a$, now provided in sleeve bearing $12_b$. O-ring seals $50_b$, or equivalent sealing structures, provide a sealing engagement with recessed receiving portion 122 of bearing retainer $19_b$ to seal squeeze film annulus $H_b$ from the exterior environment.

Bearing retainer $18_b$ and sleeve bearing $12_b$, when associated, cooperatively define a plurality of individual receiving recesses $70_b$ that are generally similar to recesses 70 discussed previously in connection with bearing assembly 10. More particularly, bearing retainer $18_b$ defines the discrete recesses $70_b$ with sleeve bearing $12_b$ axially outside of the cooperative engagement between radial depending portion 120 and recessed receiving portion 122 (i.e., in the axial ends of bearing retainer $18_b$). Recesses $70_b$ are discretely defined between a radial inner surface or side 130 of bearing retainer $18_b$ and the radial outer side 124 of sleeve bearing $12_b$. Centering elements $80_b$ are typically centering spring elements and are disposed in the respective recesses $70_b$. Multiple centering elements $80_b$ are typically disposed about sleeve bearing $12_b$, but unlike the embodiment shown in FIGS. 1 and 2 do not physically interrupt the squeeze film annulus $H_b$. Typically, centering elements $80_b$ are symmetrically or uniformly distributed or spaced about the circumference of sleeve bearing $12_b$ such as 90° apart as illustrated in FIG. 6 or 72° apart as illustrated in FIG. 2. Centering elements $80_b$ are positioned radially outward from bearing $12_b$ in discrete recesses $70_b$ and act on sleeve bearing $12_b$ for centering sleeve bearing $12_b$ in squeeze film annulus $H_b$ and act to enhance the effectiveness of the squeeze film annulus $H_b$ to dampen vibration of rotor shaft $15_b$.

Centering elements $80_b$ are generally disposed to act between the radial inner surface 130 of bearing retainer $18_b$ and radial outer surface 124 of sleeve bearing $12_b$ axially outside of the cooperative engagement between depending portion 120 of bearing retainer $18_b$ and recessed receiving portion 122 of sleeve bearing $12_b$. Centering elements $80_b$ are typically in the form of cylindrical spring elements having an open, cylindrical cross-sectional shape, but may also be oval or elliptical. Centering elements $80_b$ resiliently deform when radial force is applied to the centering elements $80_b$ such as during resonance vibration of shaft 15 that is transmitted through bearing $12_b$. As a result, centering elements $80_b$ act as stiff springs with an associated stiffness to accommodate the vibration of shaft $15_b$ and resultant motion of bearing $12_b$ while supporting bearing $12_b$ within squeeze film annulus $H_b$.

Accordingly, cylindrical centering elements $80_b$ are typically in direct contact with bearing retainer $18_b$ and sleeve bearing $12_b$ and provide a stiff spring force acting between these two structures to accommodate vibration of shaft $15_b$. Centering elements $80_b$ are generally slightly shorter in axial length than the axial length of the discrete recesses $70_b$ to allow for a slight vertical compression and accompanying horizontal expansion. While recesses $70_b$ are depicted as open space for accommodating the respective centering elements $80_b$, a cage ring such as that used to the rolling elements of a rolling element bearing may be provided in place of the respective recesses $70_b$ as an alternative configuration to the structure shown in FIGS. 5-7.

Recesses $70_b$ are defined by the cooperative engagement of bearing retainer $18_b$ and sleeve bearing $12_b$, and are adapted to capture cylindrical centering elements $80_b$ therein. As shown in FIG. 5, recesses $70_b$ are not necessarily required to be enclosed recesses (i.e., "chambers") as was substantially the case in FIGS. 1 and 2. Bearing retainer $18_b$ and sleeve bearing $12_b$ may comprise respective opposed radial tabs 140, 142 for securing the respective cylindrical centering elements $80_b$ within recesses $70_b$. Thus, cylindrical centering elements $80_b$ are typically captured in recesses $70_b$ in both the axial and radial directions. FIG. 7B illustrates a modification to recesses $70_b$ and cylindrical centering elements $80_b$, wherein outward facing axial ends 144 of cylindrical centering elements $80_b$ are slightly coned or tapered to assist with pre-loading sleeve bearing $12_b$ within squeeze film annulus $H_b$. During operation, cylindrical centering elements $80_b$ substantially do not "roll" within recesses $70_b$ or may roll a minimal amount when following the precessional motion of bearing $12_b$. As indicated, the multiple centering elements $80_b$ act between bearing retainer $18_b$ and bearing $12_b$ to center sleeve bearing $12_b$ within squeeze film annulus $H_b$ to enhance performance of squeeze film annulus $H_b$ and prevent the "bottoming-out" or "topping-out" of sleeve bearing $12_b$ within squeeze film annulus $H_b$. Centering elements $80_b$ exert radially inwardly directed forces on sleeve bearing $12_b$ and radially outwardly directed forces on bearing retainer $18_b$ to accomplish the centering of sleeve bearing $12_b$. These applied forces are equal and opposite and function to center sleeve bearing $12_b$ radially within squeeze film annulus $H_b$.

FIGS. 8-11 show several additional embodiments of centering elements 150 that may be used in bearing assembly $10_b$ described hereinabove. Centering elements 150 shown in FIGS. 8-11 are disposed in respective recesses 152 which are generally similar to recesses $70_b$ discussed previously, only now shaped or formed to the configuration of the centering elements 150. Centering elements 150 may be secured in the recesses 152 by similar structure discussed previously in connection with FIGS. 5-7 or by other suitable methods including a friction fit insertion or by being welded in place in recesses 152.

Figure 8B:
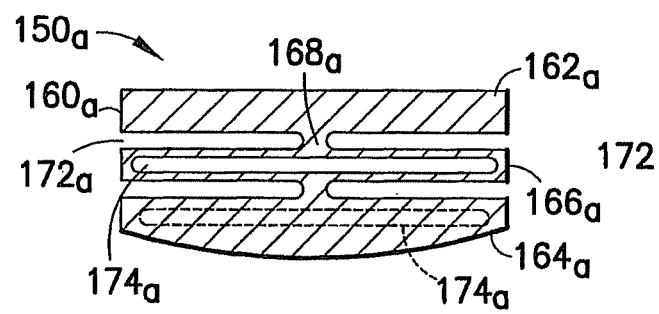
FIG. 8B is a cross-sectional view of one of the load cell spring shown in FIG. 8A.

With the foregoing in mind, FIGS. 8A and 8B show bearing assembly $10_b$ with centering elements $150_a$ according to a first embodiment. As indicated, centering elements $150_a$ are disposed at uniformly spaced locations around sleeve bearing $12_b$ in recesses $152_a$ provided at these locations. More particularly, centering elements $150_a$ are symmetrically or uniformly distributed or spaced about the circumference of sleeve bearing $12_b$ such as 90° apart as illustrated in FIG. 8A or 72° apart as illustrated in FIG. 2. Centering elements $150_a$ are positioned radially outward from bearing $12_b$ and act on sleeve bearing $12_b$ for centering sleeve bearing $12_b$ in squeeze film annulus $H_b$ and act to enhance the effectiveness of the squeeze film annulus $H_b$ to dampen vibration of rotor shaft $15_b$. Centering elements $150_a$ are representative of the various embodiments of this structure shown in FIG. 8-11, and are generally pad-like structures disposed, as indicated, at four (4), 90° radial locations around sleeve bearing $12_b$. Spring elements $150_a$ each generally comprise a body $160_a$ comprising a base beam member or element $162_a$, a distal beam member $164_a$, and an intermediate beam member or element $166_a$ connecting base beam member $162_a$ and distal beam member $164_a$. Distal beam member $164_a$ and intermediate beam member $166_a$ generally form or define a plurality of overlapping cantilevered beam spring elements radially outward from base member $162_a$. Overlapping distal beam member $164_a$ and intermediate beam member $166_a$ form a resilient beam spring network for each centering element $150_a$ and, as can be appreciated from FIGS. 8 and 8A, are cantilevered outward from a central area or portion $168_a$ of body $160_a$ of each centering element $150_a$. Additionally, intervening spaces $172_a$ are defined between distal beam member $164_a$ and intermediate beam member $166_a$ and between intermediate beam member $166_a$ and base beam member $162_a$, which allows the distal and intermediate beam members $164_a$, $166_a$ to function as beam spring elements under radial load conditions applied to centering elements $150_a$. Intermediate beam member $166_a$, as shown in FIGS. 8A and 8B, may define an internal space $174_a$ therein, thus making the wall of intermediate beam member $166_a$ thin to allow compression thereof when radial force is applied to body $160_a$. Such an internal space $174_a$ (as shown in dashed lines) may also be provided in distal beam member $164_a$. In particular, as radial force is applied to body $160_a$, distal beam member $164_a$ will deflect about central portion $168_a$ to typically contact intermediate beam member $166_a$, which will also typically compress towards base beam member $162_a$. However, the spring force in each of these beam "springs" will act to resist such deflection or compression thereof, and provide a resilient force resisting the radial load or force applied to centering elements $150_a$.

As will also be appreciated from FIGS. 8A and 8B, intermediate beam member $166_a$ and distal beam member $164_a$ are relatively short beams which will limit their flexibility and thereby increase their stiffness. Thus, each centering element $150_a$, taken as a whole, will be a relative stiff "resilient" structure of only moderate flexibility, and will operate in a manner analogous to a load cell, and may alternatively be referred to as "load cell springs". It will be recognized that such "load cell springs" are used primarily as springs and not as conventional load cells, but could further be used or instrumented to operate as load cells, if desired. A plurality of load cell springs are arranged in discrete, stationary positions along the radial inner surface 130 of bearing retainer $18_b$. They center the rotating shaft by making discrete points of contact with the radial outer surface 124 of sleeve bearing $12_b$. Accordingly, the load cell springs, as shown in FIGS. 8A-8E, 9A-9B, 10A-10F, and 11A-11B are different than the centering wave spring shown in FIGS. 3 and 4. Additionally, as further shown in FIG. 8A, the generally flat or planar underside of base beam member $162_a$ is in contact with sleeve bearing $12_b$ and the width (i.e., radial height) of base member $162_a$ may be machined or shimmed to adjust the centering clearance of sleeve bearing $12_b$ in squeeze film annulus $H_b$. Each individual centering element $150_a$ may be individual machined or shimmed as necessary to adjust the centering clearance of sleeve bearing $12_b$ in squeeze film annulus $H_b$ thereby improving maintenance and operation of the turbomachine incorporating bearing assembly $10_b$. In addition, grinding or shimming can also be used to assist with pre-loading sleeve bearing $12_b$ within squeeze film annulus $H_b$. This process may be repeated with any of the embodiments of centering elements 150 discussed herein.

As indicated previously, an internal space $174_a$ may optionally be provided in distal beam member $164_a$, as shown in dashed lines in FIG. 8B. Internal spaces $174_a$ make distal beam member $164_a$ and/or intermediate beam member $166_a$ relatively thin-walled to allow for the deflection and compression of distal beam member $164_a$ toward intermediate beam member $164_a$ and intermediate beam member $166_a$ toward base beam member $162_a$. One or both of internal spaces $174_a$ may be omitted, if desired, in centering element $150_a$. Additionally, internal spaces $174_a$ may each be provided as a plurality of individual internal spaces $174_a$, for example in the manner shown in FIG. 10E described herein, rather than the singular space or void illustrated in FIG. 8A.

Figure 9A:
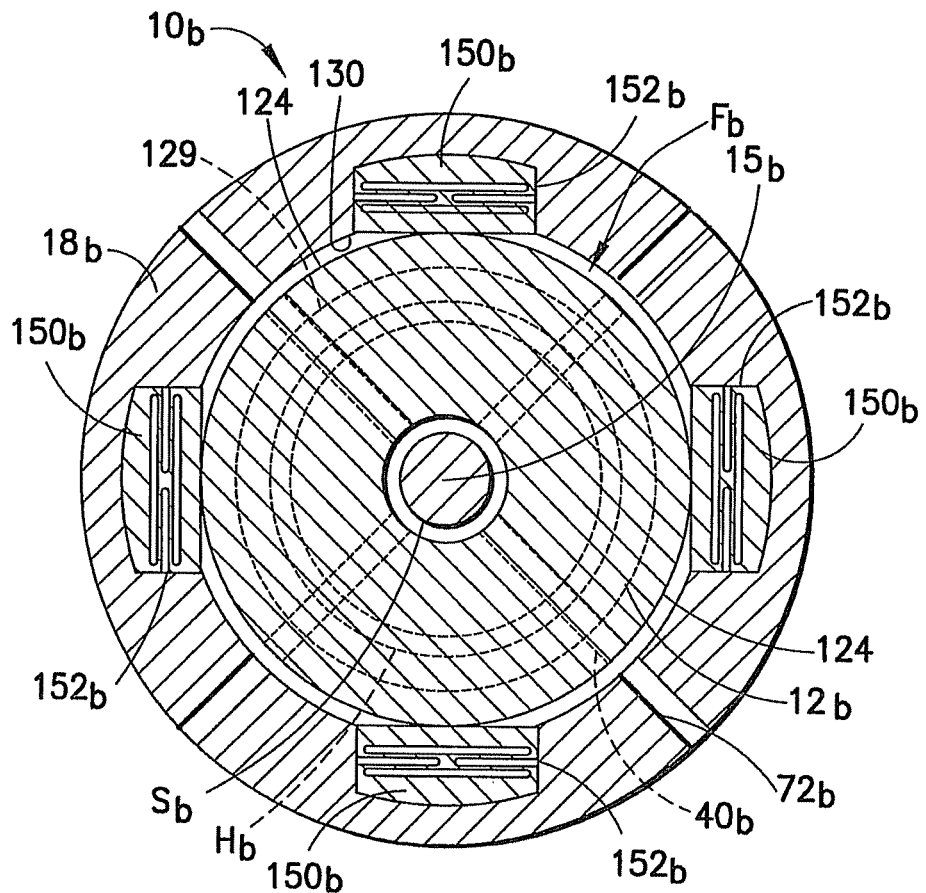
FIG. 9A is a cross-sectional view of the bearing assembly of FIG. 5 comprising load cell springs according to a second embodiment.
Figure 9B:
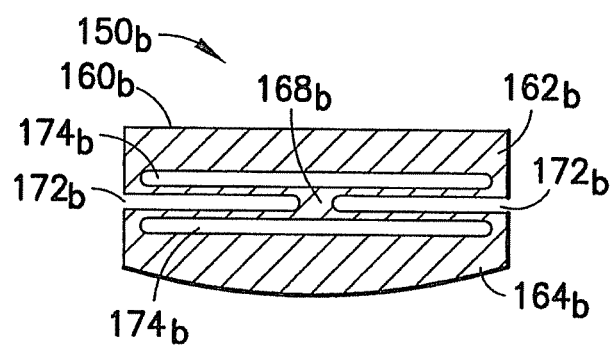
FIG. 9B is a cross-sectional view of one of the load cell springs shown in FIG. 9A.

FIGS. 9A and 9B illustrate bearing assembly $10_b$ with a second embodiment of centering elements $150_b$. In centering elements $150_b$, intermediate beam member $166_a$ is omitted and distal beam member $164_b$ and base beam member $162_b$ are connected by a central connecting "post" portion or member $168_b$ of body $160_b$. Post member $168_b$ will permit distal beam member $164_b$ to deflect about post portion $168_b$ and compress towards base beam member $162_b$ when radial force is applied to centering element $150_b$. Base beam member $162_b$ and distal beam member $164_b$ may each define an elongated internal space $174_b$ making these members relatively thin-walled in the vicinity of post portion $168_b$ to allow for the deflection and compression of distal beam member $164_b$ about post member $162_b$. One or both of internal spaces $174_b$ may be omitted, if desired, in centering element $150_b$. Additionally, internal spaces $174_b$ may each be alternatively provided as a plurality of individual internal spaces $174_b$, for example, in the manner shown in FIG. 10E described herein, rather than the singular space or void illustrated in FIGS. 9A-9B.

Figure 10A:
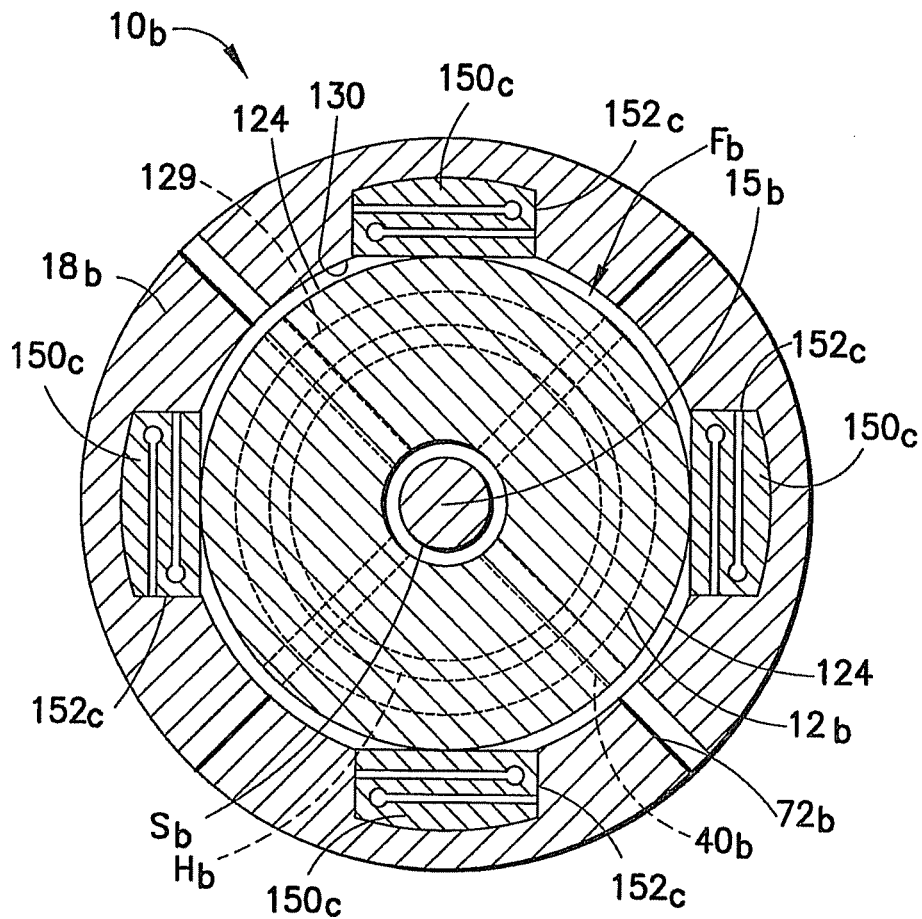
FIG. 10A is a cross-sectional view of the bearing assembly of FIG. 5 comprising load cell springs according to a third embodiment.
Figure 10B:
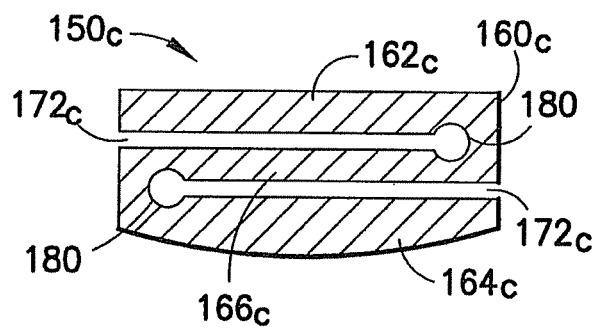
FIG. 10B is a cross-sectional view of one of the load cell springs shown in FIG. 10A.
Figure 10C:
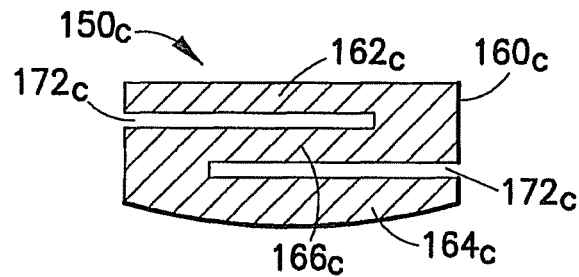
FIG. 10C is a cross-sectional view of a first exemplary alternative design for the load cell spring of FIG. 10B.
Figure 10D:
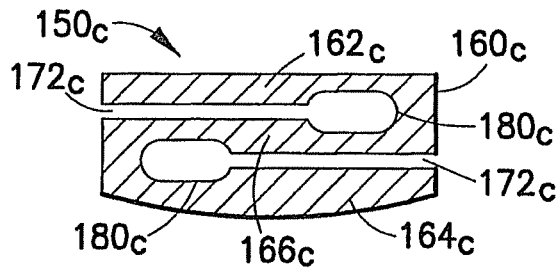
FIG. 10D is a cross-sectional view of a second exemplary alternative design for the load cell spring of FIG. 10B.

FIGS. 10A and 10B illustrate bearing assembly $10_b$ with a third embodiment of centering elements $150_c$. In centering elements $150_c$, base beam member $162_c$, intermediate beam member $166_c$, and distal beam member $164_c$ define an overall S-shape for centering elements $150_c$. Intervening spaces $172_c$ are defined between intermediate beam member $166_c$ and base beam member $162_c$ and distal beam member $164_c$ and intermediate beam member $166_c$ to allow deflection of distal beam member $164_c$ and intermediate beam member $166_c$. Deflection characteristics of distal beam member $164_c$ and intermediate beam member $166_c$ may be controlled by the sizing of cut-out areas 180 in the areas of body $160_c$ connecting intermediate beam member $166_c$ to base beam member $162_c$ and connecting distal beam member $164_c$ to intermediate beam member $166_c$. Cut-out areas 180 may be provided in shapes other than the circular shape illustrated in FIGS. 10A and 10B, such as oval, elliptical or be simply elongated, generally polygonal shaped cut-out areas 180, as shown in FIG. 10D. Cut-out areas 180 may also be omitted altogether if desired as shown in FIG. 10C. As will be appreciated from FIGS. 10A and 10B, intermediate beam member $166_c$ and distal beam member $164_c$ comprise two oppositely facing cantilevered beam springs which will deflect toward base beam member $162_c$ when external radial force is applied to the body $160_c$ of centering element $150_c$, and provide a resilient counter-acting force to such a compressive radial force.

Figure 10E:
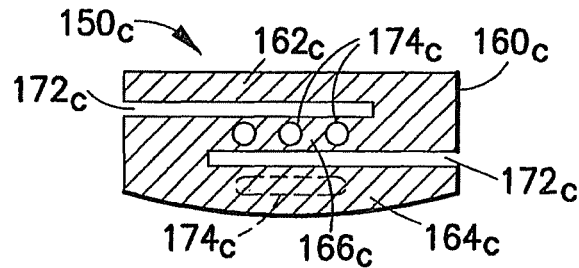
FIG. 10E is a cross-sectional view of a third exemplary alternative design for the load cell spring of FIG. 10B.
Figure 10F:
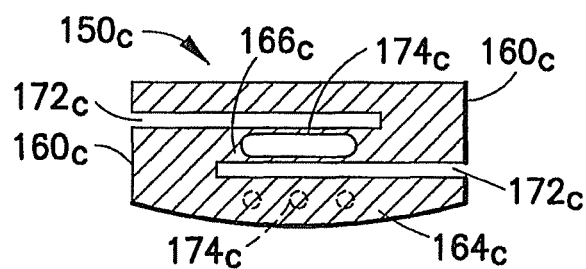
FIG. 10F is a cross-sectional view of a fourth exemplary alternative design for the load cell spring of FIG. 10B.

Finally, and as shown in FIGS. 10E and 10F with respect to centering elements $150_c$, intermediate beam member $166_c$ and distal beam member $164_c$ may each define one or more internal spaces $174_c$ to make these structures thinner-walled and aid in the deflection and compression of distal beam member $164_c$ toward intermediate beam member $166_c$ and intermediate beam member 166$_c$ toward base beam member 162$_c$. Generally, internal spaces 174$_c$ in this embodiment, and in the previous embodiments shown in FIGS. 8A and 8B, 9A and 9B, and in FIGS. 11A-11E to be discussed herein, may be used to adjust the overall "stiffness" of the respective centering elements 150. The internal space(s) 174$_c$ in one or both of the distal beam member 164$_c$ and intermediate beam member 166$_c$ may be omitted, if desired, in centering elements 150$_c$. Additionally, the internal spaces 174$_c$ may be provided as a plurality of internal spaces 174$_c$ in the distal beam member 164$_c$ and/or the intermediate beam member 166$_c$ as shown in FIGS. 10E-10F. The internal spaces 174$_c$ may also be elongated in the manner shown, for example, in FIG. 9B to span the length of the body 160$_c$ of the centering elements 150$_c$.

Figure 11A:
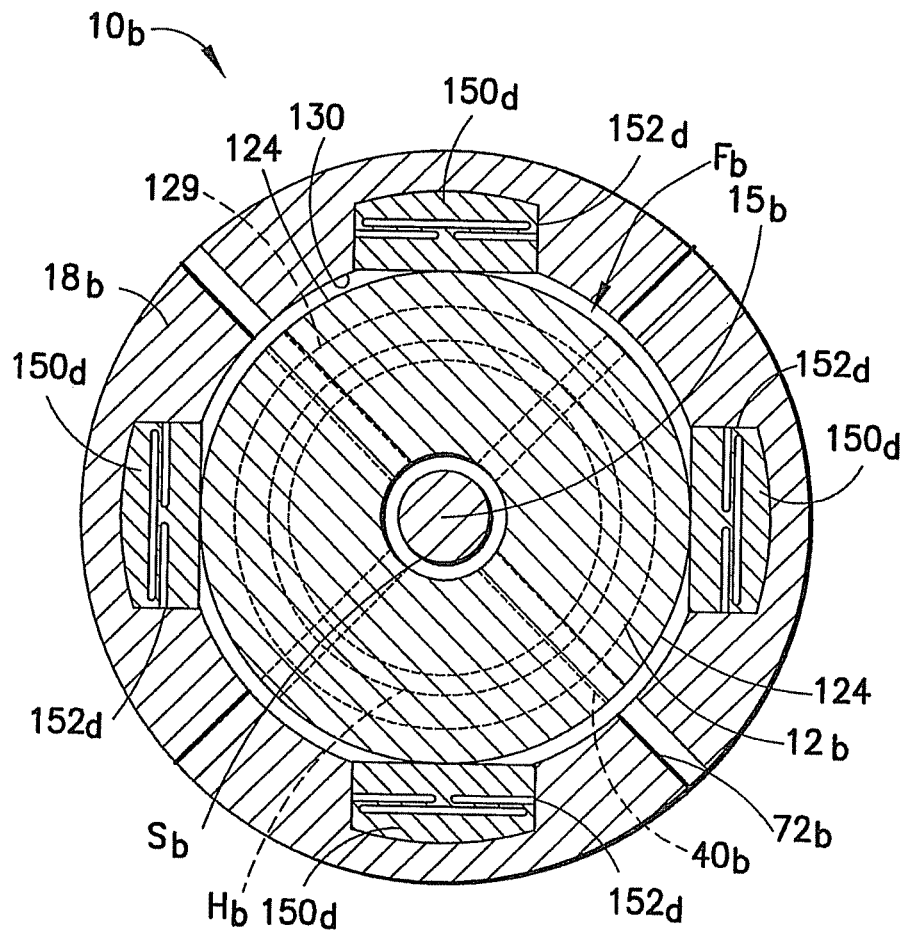
FIG. 11A is a cross-sectional view of the bearing assembly of FIG. 5 comprising load cell springs according to a fourth embodiment.
Figure 11B:
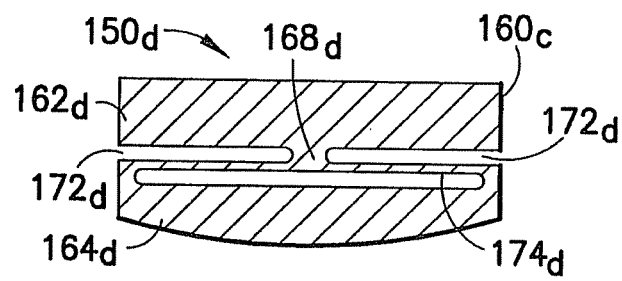
FIG. 11B is a cross-sectional view of one of the load cell springs shown in FIG. 11A.

FIGS. 11A and 11B, illustrate bearing assembly 10$_b$ with a fourth embodiment of centering elements 150$_d$. Centering elements 150$_d$ are substantially similarly to centering elements 150$_b$ discussed previously, with the exception that base beam member 162$_d$ does not define an internal space as was the case in centering element 150$_b$. Accordingly, centering elements 150$_d$ will generally provide a stiffer reaction force to a radial force applied to centering elements 150$_d$ than will centering elements 150$_b$ of FIGS. 9A and 9B. Centering elements 150$_a$-150$_d$ described hereinabove are each essentially formed as a single or unitary component. Additionally, the thickness and length of the respective beam segments or members forming the respective centering elements 150$_a$-150$_d$ may be altered to change the stiffness values of the respective centering elements 150$_a$-150$_d$ as desired.

Figure 8C:
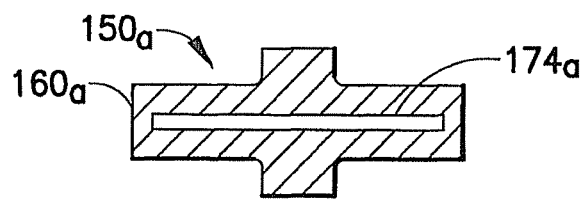
FIG. 8C is a cross-sectional view of a first exemplary alternative design for the load cell spring of FIG. 8B.
Figure 8D:
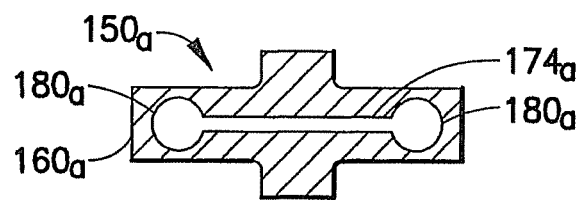
FIG. 8D is a cross-sectional view of a second exemplary alternative design for the load cell spring of FIG. 8B.
Figure 8E:
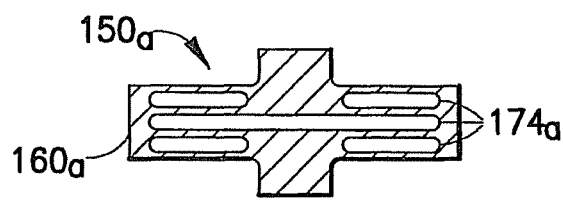
FIG. 8E is a cross-sectional view of a third exemplary alternative design for the load cell spring of FIG. 8B.

Alternative variations of centering elements 150$_a$ are shown in FIGS. 8C-8E, wherein the body 160$_a$ of centering elements 150$_a$ is formed without an intermediate beam member 166$_a$ and defines one or more internal spaces 174$_a$ which take the place of intermediate beam member 166$_1$. As shown in FIGS. 8C-8D, a singular, elongated internal space 174$_a$ may be sufficient, or multiple internal spaces 174$_a$ may be provided as shown in FIG. 8E. Each internal space 174$_a$ may be provided as a plurality of internal spaces 174$_a$ as illustrated in FIGS. 10E and 10F discussed previously. Additionally, as shown in FIG. 8D, a singular, elongated internal space 174$_a$ may be defined with cut-out areas 180$_a$ similar to that illustrated in FIG. 10B or, further, as shown in FIG. 10D if desired.

While the present invention was described with reference to several distinct embodiments of a bearing assembly and support structure therefor, those skilled in the art may make modifications and alterations to the present invention without departing from the scope and spirit of the invention. Accordingly, the above-detailed description is intended to be illustrative rather than restrictive. The invention is defined by the appended claims, and all changes to the invention that fall within the meaning and range of equivalency of the claims are to be embraced within their scope.

The invention claimed is:

1. A method of positioning a bearing of a turbomachine in a squeeze film annulus, comprising:
   providing a bearing in which a rotor shaft is disposed and a bearing support mounted about and radially supporting the bearing, the bearing support at least in part defining the squeeze film annulus; and
   providing a plurality of individual centering elements that are separated and uniformly provided at radially and circumferentially spaced locations around the bearing without overlapping one another, and are associated with the bearing and bearing support and acting to center the bearing within the squeeze film annulus; and
   wherein the centering elements comprise load cell springs, each of the load cell springs comprising a plurality of overlapping beam members separated by a space.

2. The method as claimed in claim 1 wherein at least one of the overlapping beam members defines an internal space therein.

3. The method as claimed in claim 1 wherein the plurality of overlapping beam members define a plurality of intervening spaces between the beam members.

4. A method of positioning a bearing of a turbomachine in a squeeze film annulus, comprising:
   providing a bearing in which a rotor shaft is disposed and a bearing support mounted about and radially supporting the bearing, the bearing support at least in part defining the squeeze film annulus; and
   providing a plurality of individual centering elements that are separated and uniformly provided at radially and circumferentially spaced locations around the bearing without overlapping one another, and are associated with the bearing and bearing support and acting to center the bearing within the squeeze film annulus; and
   wherein the centering elements comprise load cell springs, each of the load cell springs comprising a unitary body defining at least one internal space therein.

* * * * *